[11] 3,626,038

[72] Inventor Nathan G.
 Plainfield, N.J.
[21] Appl. No. 729,448
[22] Filed May 15, 1968
[45] Patented Dec. 7, 1971
[73] Assignee Merck & Co. Inc.
 Rahway, N.J.

[54] PROCESS FOR PREPARING DIESTERS OF CIS-PROPENYL-PHOSPHONIC ACID
 4 Claims, No Drawings
[52] U.S. Cl............................................. 260/968,
 106/15 R, 260/348 R, 260/502.4 R, 260/922,
 260/953, 260/956, 424/203
[51] Int. Cl........................................................ C07f 9/40,
 A01n 9/36

.................................... 260/968,
 922

*Primary Examiner*—Charles B. Parker
*Assistant Examiner*—Anton H. Sutto
*Attorneys*—J. Jerome Behan, J. Frederick Gerkens and I. Louis Wolk ABSTRACT: A method for the preparation of a diester of cis-propenyl-phosphonic acid which comprises treating a diester of ethynyl phosphonic acid with tetramethyl diborane to afford a transdiester of [2-dimethylboryl)vinyl] phosphonic acid, which intermediate, upon treatment with iodine in the presence of a base, yields the desired product. The product thus obtained is an intermediate which may be converted to cis-propenylphosphonic acid and then to the antimicrobially active (-) (cis-1,2-epoxypropyl) phosphonic acid and its salts.

3,626,038

PROCESS FOR PREPARING DIESTERS OF CIS-PROPENYL-PHOSPHONIC ACID

This invention relates to a novel method for stereospecifically preparing the ester derivatives of cis-propenyl phosphonic acid.

The process of this invention comprises treating a diester derivative of ethynyl phosphonic acid with tetramethyl diborane to yield a transdiester derivative of 2-(dimethylboryl)vinyl phosphonic acid which is treated with iodine in the presence of a base to yield the diester derivative of cis-propenyl phosphonic acid. This reaction sequence may be illustrated as follows:

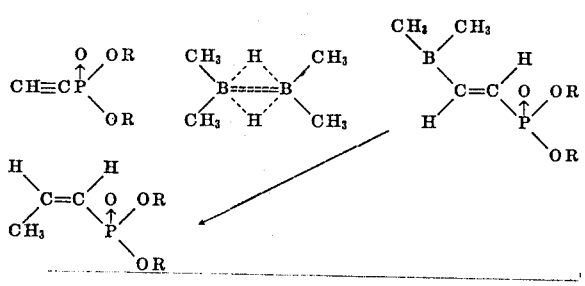

wherein R is lower alkyl, such as methyl, ethyl, isopropyl, n-butyl, tertbutyl and the like; mononuclear aryl, such as phenyl, and the like; mononuclear aralkyl such as benzyl; lower alkenyl such as allyl and the like, lower alkynyl such as propargyl and the like, cycloalkyl such as cyclohexyl and the like.

The reaction of the diester derivative of ethynylphosphonic acid with tetramethyl diborane (it is believed that the reacting species is dimethyl borane) to produce the transdiester derivative of [2-(dimethylboryl)vinyl]-phosphonic acid is generally conducted in an inert solvent such as tetrahydrofuran, diethyl ether, dibutyl ether, 1,2-dimethoxy ethane, diethylene glycol dimethyl ether, and the like. The reaction of iodine with the transdiester derivative of [2-(dimethylboryl)vinyl]phosphonic acid to produce the diester of cis-propenylphosphonic acid is conducted in the presence of a suitable base such as the alkali and alkaline earth metal hydroxides. While iodine by itself is sufficient for the stereoselective synthesis of the ester derivative of cis-propenyl phosphonic acid, it is preferable to conduct the stereospecific synthesis of the ester derivative of cis-propenyl phosphonic acid in the presence of a base. The designation cis used in describing the 1,2-epoxypropyl phosphonic acid compounds means that each of the hydrogen atoms attached to carbon atoms one and two of the propylphosphonic acid are on the same side of the oxide ring.

Any solvent in which the reactants are partly soluble and which is suitably inert to the reactants may be used, such as tetrahydrofuran, benzene, carbon tetrachloride, 1,2-dimethoxyethane, diethyleneglycol dimethyl ether, and the like. Due to the nature of the reactants, the reaction is usually conducted below 40° and preferably at −10° to −0° C. when conducted at atmospheric pressure.

The ester derivative is hydrolyzed to cis-propenylphosphonic acid in various ways which include treatment with a mineral acid such as sulfuric or hydrochloric in the presence of a buffer, trimethylchlorosilane, or toluene sulfonic acid. The cis-propenylphosphonic acid may then be epoxidized to the (±) (cis-1,2-epoxypropyl)phosphonic acid with a suitable oxidizing agent such as hydrogen peroxide in the presence of an alkali metal pertungstate.

The racemic mixture of (±) (cis-1,2-epoxypropyl)phosphonic acid can be resolved into its optically active components by the crystallization of salts of the acid prepared by reaction with an optically active base. Suitable bases which can be employed for this purpose are quinine, d-α-phenethylamine, strychnine, quinidine, and the like. After one of the salts is isolated, it can be treated with a base such as sodium hydroxide, calcium carbonate, or ammonium hydroxide in order to obtain the optically active acid in the form of a salt, the particular salt depending upon the base used. If desired, the (−) (cis-1,2-epoxypropyl)phosphonic acid may be obtained by various means as for example by passing its alkali or alkaline earth metal derivatives through an ion exchange resin at 0°–5° C. on its hydrogen cycle.

The (−) (cis-1,2-epoxypropyl)phosphonic acid referred to herein rotates plane-polarized light in a counterclockwise direction (to the left as viewed by the observer) when the rotation of its disodium salt is measured in water (5 percent concentration) at 405 mμ.

The ester derivatives of ethynylphosphonic acid are prepared by first treating 3-pyranyloxy-3-methyl-1-bromo-1-butyne with a diester derivation of sodium phosphite to yield the diester derivative of 3-hydroxy-3-methyl-1-butynyl phosphonate, which is then treated with cesium carbonate at elevated temperature and reduced pressure to produce the desired ester derivative of ethynylphosphonic acid as illustrated by the following equation:

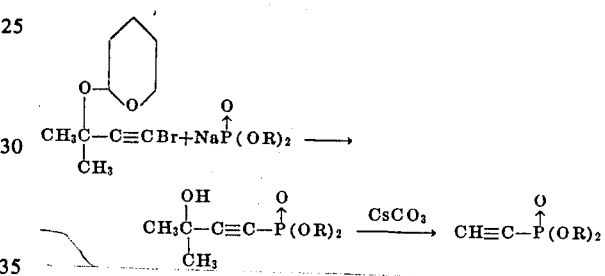

wherein R is lower alkyl, lower alkenyl, lower alkynyl, mononuclear aryl, mononuclear aralkyl, and cycloalkyl. The diester sodium phosphite derivative is prepared by treating an appropriately substituted phosphonic acid with sodium hydride as shown by the following equation:

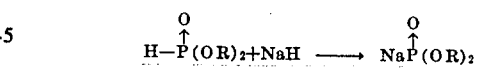

wherein R is as defined above.

The (±) and (−) (cis-1,2-epoxypropyl)phosphonic acid and its salts are useful as antimicrobial agents, which inhibit the growth of both gram-positive and gram-negative pathogenic bacteria. The (−) form, and particularly its salts such as the sodium and calcium salts, are active against *Bacillus*, *Escherichia*, *Staphylococci*, *Salmonella* and *Proteus* pathogens, and antibiotic-resistant strains thereof. Salts of (−) (cis-1,2-epoxypropyl)phosphonic acid are also useful in the treatment of diseases caused by bacterial infections in man and animals and is particularly valuable in this respect, since it is active against strains of pathogens which are resistant to currently used antibacterial agents. These are especially valuable, since they are effective when given orally, although they can also be administered parenterally.

In addition, the salts of (±) (cis-1,2-epoxypropyl)phosphonic acid are useful as preservatives in industrial applications since they effectively inhibit undesirable bacterial growth in the white water used in paper mills and in paints, e.g., in polyvinyl acetate latex paint.

The following examples illustrate a method of preparing the (±) and (−) (cis-1,2-epoxypropyl)phosphonic acid and its salts and esters thereof according to the process of this invention. However, the examples are illustrative only and it will be apparent to one having ordinary skill that all the products of the invention may be prepared by substituting the appropriate starting materials for those used in the examples.

EXAMPLE 1

(±) and (−) Cis-1,2-epoxypropyl)phosphonic Acid and Ammonium Salt

Step A: Diisopropyl sodium phosphite

To a solution of diisopropyl phosphonate (16.6 g., 0.1 mole) in 2-ethoxyethanol (100 ml.) is added cautiously a sodium hydride in oil dispersion (4.8 g., 0.1 mole, 50 percent mineral oil) portionwise. The reaction mixture is stirred under a nitrogen atmosphere at room temperature until the evolution of hydrogen stops. The solvent is evaporated and the residue of diisopropyl sodium phosphite is used in the following step.

Step B: Diisopropyl Ethynylphosphonate

To a solution of diisopropyl sodium phosphite (18.8 g., 0.1 mole) in tetrahydrofuran (100 ml.) is added 3-pyranyloxy-3-methyl-1-bromo-1-butyne (0.1 mole) at −70° C. The mixture is maintained at −70° C. for 12 hours and then brought slowly to room temperature to yield the phosphonate of the pyranyl ether. The tetrahydrofuran is removed under vacuum and the residual oil dissolved in methanol (40 ml.) containing sulfuric acid (25 percent, 3 ml.) for 2 hours to yield diisopropyl(3-hydroxy-3-methyl-1-butynyl)phosphonate. Diisopropyl(3-hydroxy-3-methyl-1-butynyl)phosphonate is then heated at 100° C. and 0.5 mm. of mercury in the presence of cesium carbonate (0.2 g.) to yield diisopropyl ethynylphosphonate.

Step C: Diisopropyl cis-propenylphosphonate

To a solution of tetramethyl diborane (1.45 g., 25 mmoles) in tetrahydrofuran (30 ml.) at −10° C. is added a solution of diisopropyl ethynylphosphonate (6.7 g., 25 mmoles) in tetrahydrofuran (40 ml.). After a complete solution is formed, the diisopropyl [2-(dimethylboryl)vinyl]phosphonate reaction mixture is stirred for an additional 30 minutes at room temperature. The reaction mixture is again cooled to −10° C. and a sodium hydroxide solution (20 ml., 6N) is added. A solution of iodine (6.35 g., 25 mmoles) in tetrahydrofuran (10 ml.) is then added over a period of 15 minutes. The reaction mixture is then allowed to come to room temperature and the excess iodine is decomposed by the addition of aqueous sodium thiosulfate. The diisopropyl cis-propenylphosphonate is extracted with chloroform. The chloroform solution is dried and filtered and the solvent removed under vacuum to yield diisopropyl cis-propenylphosphonate.

Step D: Cis-propenylphosphonic acid

Diisopropyl cis-propenylphosphonate (1.5 g., 0.005 mole) is dissolved in 8.0 ml. of concentrated hydrochloric acid (12.4 N) and the solution is heated in an oil bath at 105°–110° C. for 1 hour. The reaction mixture is allowed to cool to room temperature, after which the solution is concentrated in vacuo with heating. Water (5 ml.) is added to the residue, and the evaporation process is repeated yielding 0.64 g. of cis-propenylphosphonic acid as a pale yellow residue, which is characterized by IR and NMR spectra.

Step E: Monosodium salt of (±) (cis-1,2-epoxypropyl)phosphonic Acid

Cis-propenylphosphonic acid (2.2 g., 0.018 mole) is dissolved in 10 ml. of water. The pH of the aqueous solution is adjusted to 5.5–6 by the addition of sodium bicarbonate (1.51 g., 0.017 mole). Sodium tungstate dihydrate (0.55 g., 0.0017 mole) is added, and the nearly neutral solution is placed in a water bath and heated to 55° C. The water bath is then removed, and 2 ml. of 30 percent hydrogen peroxide are added to the reaction mixture during 10 minutes. The reaction is exothermic, and the temperature rises to 65° C. during addition of the peroxide. An additional 1.6 ml. of hydrogen peroxide is added. Oxygen evolves from the solution during the addition, and the temperature remains at 55°–57° C. without external heating. After standing 20 minutes, the temperature falls to 53° C. for an additional 20 minutes, after which the solution is freeze-dried to yield the monosodium salt of (±) (cis-1,2-epoxypropyl)phosphonic acid as a white powder. The (±) (cis-1,2-epoxypropyl)phosphonic acid is obtained by passing an aqueous solution of the monosodium salt through an ion exchange column containing Dowex 120 at 0° to 5° C. on its hydrogen cycle.

Step F: (±) and (−) (Cis-1,2-epoxypropyl)phosphonic Acid and Ammonium Salt (±) (Cis-1,2-epoxypropyl)phosphonic acid (5.0 g., 0.041 mole) is dissolved in water (0.5 ml.) and the solution neutralized to a pH of 5.5 by the careful addition of ammonium hydroxide to obtain the ammonium salt of (±) (cis-1,2-epoxypropyl)phosphonic acid. The ammonium salt is then treated with a d-α-phenethylamine (2.24 g., 0.0185 mole) in methanol (200 ml.). The solution is concentrated to dryness and the residue dissolved in methanol (50 ml.) and seeded with a few crystals of the d-α-phenethylamine salt of (−) (cis-1,2-epoxypropyl)phosphonic acid. The mixture is allowed to stand at room temperature, whereupon the crystalline salt precipitates. The precipitate is collected, triturated with methanol, recollected and washed with ethanol and acetone to yield the d-α-phenethylamine salt of (−) (cis-1,2-epoxypropyl)-phosphonic acid having a melting point of 135°–137° C. The product has a specific rotation of −2.6° at 4,050 A. and 28° C. 165 mg. of the d-α-phenethylamine salt is then reconverted to the ammonium salt of (−) (cis-1,2-epoxypropyl)phosphonic acid by suspending the d-α-phenethylamine salt in water and adding a small amount of ammonium hydroxide. The resulting suspension is extracted with chloroform. The aqueous phase is separated from the organic phase and freeze dried to obtain the ammonium salt of (−) (cis-1,2-epoxypropyl)phosphonic acid. The ammonium salt is dissolved in 2 ml. of water and the specific rotation is measured in a 0.5 decimeter tube. The product, calculated on the basis of the free acid, has a specific rotation of −16° at 4,050 A. and 28° C.

By substituting for the diisopropyl phosphonate in example 1, step A, an equivalent quantity of diphenyl phosphonate and then dicyclohexyl phosphonate and conducting the reaction as described therein, there is obtained respectively diphenyl sodium phosphite and dicyclohexyl sodium phosphite which are converted to (−) (cis-1,2-epoxypropyl)phosphonic acid and its salts by following the procedures of steps B through F.

EXAMPLE 2

Diethyl Cis-propenylphosphonate

Step A: Diethyl ethynylphosphonate

The above compound is prepared following essentially the same methods described in example 1, step B, using an equimolar amount of diethyl sodium phosphite, in plate of the diisopropyl sodium phosphite used in that example, to give diethyl ethynylphosphonate.

Step B: Diethyl Cis-propenylphosphonate

To a solution of tetramethyl diborane (1.45 g., 25 mmoles) in tetrahydrofuran (20 ml.) is added a solution of 4.03 g. of diethyl ethynylphosphonate (4.03 g., 25 mmoles) in tetrahydrofuran (25 ml.) at −10° C. After a complete solution is formed, the reaction mixture containing the diethyl [2-(dimethylboryl)vinyl]phosphonate is allowed to come to room temperature and then stirred for an additional 45 minutes. The reaction mixture is then cooled again to −10° C. and a sodium hydroxide solution (15 ml., 6N) is added followed by the dropwise addition of a solution of iodine (6.35 g., 25 mmoles) in tetrahydrofuran (10 ml.) over a period of 20 minutes. The reaction mixture is allowed to come to room temperature and any excess iodine is decomposed by the addition of aqueous sodium thiosulfate. The diethyl cis-propenylphosphonate is extracted into pentane and the solution dried. The pentane solution is filtered and the solvent removed under vacuum to yield diethyl cis-propenylphosphonate.

By substituting for the diisopropyl sodium phosphite of example 1, step A, an equimolar quantity of di-n-butyl sodium phosphite and dimethyl sodium phosphite there is obtained respectively di-n-butyl ethynyl phosphonate and finally dimethyl ethynyl phosphonate which when substituted for the diethyl ethynyl phosphonate of example 2, step B, and conducting the reaction as described therein, there is obtained respectively di-n-butyl cis propenyl phosphonate and dimethyl cis propenyl phosphonate.

EXAMPLE 3

Diallyl cis-propenylphosphonate

Step A: Diallyl sodium phosphite

By substituting an equimolar amount of diallyl phosphonate for the diisopropyl phosphonate of step A, example 1, and following procedure therein, there is obtained diallyl sodium phosphite.

Step B: Diallyl Ethynylphosphonate

To a solution of diallyl sodium phosphite (18.5 g., 0.1 mole) in tetrahydrofuran (100 ml.) is added 3-pyranyloxy-3-methyl-1-bromo-1-butyne (0.1 mole at −70° C.). The mixture is maintained at −70° for 12 hours and then brought slowly to room temperature to yield the phosphonate of the pyranyl ether. The tetrahydrofuran is removed under vacuum and the residual oil dissolved in methanol (40 ml.) containing sulfuric acid (25 percent, 3 ml.) is stirred for 2 hours to yield diallyl(Diallyl-(3-hydroxy-3-methyl-1-butynyl)phosphonate is then heated at 100° C. and 0.5 mm. of mercury in the presence of cesium carbonate (0.2 g.). The reaction mixture is then cooled and a stoichiometric amount of allyl bromide added and the reaction mixture is then heated at 50° C. for 1 hour. The reaction mixture is filtered and the solvent removed to yield diallyl ethynylphosphonate.

Step C: Diallyl cis-propenylphosphonate

To tetramethyl diborane (1.45 g., 25 mmoles) in tetrahydrofuran (20 ml.) at −10° C. is added a solution of diallyl ethynylphosphonate (4.6 g., 25 mmoles) in 20 ml. of tetrahydrofuran. After a complete solution is formed, the reaction mixture containing the diallyl [2(dimethyl-boryl)vinyl]phosphonate is stirred for an additional 45 minutes at room temperature. The reaction mixture is then cooled again to −10° C. and a sodium hydroxide solution (15 ml., 6N) is then added followed by the dropwise addition of a solution of iodine (6.35 g., 25 mmoles) in tetrahydrofuran (10 ml.) over a period of 15 minutes. The reaction mixture is then allowed to come to room temperature and any excess iodine is decomposed by the addition of aqueous sodium thiosulfate. The diallyl cis-propenylphosphonate is extracted with 2×50 ml. portions of chloroform. The chloroform solution is dried and filtered and the solvent removed under vacuum to yield diallyl cis-propenylphosphonate.

By substituting for the diallyl phosphonate in example 3, step A, an equivalent quantity of dipropargyl phosphonate and dibenzyl phosphonate and by conducting the reaction as described in example 1, step A, there is obtained respectively dipropargyl sodium phosphite and dibenzyl sodium phosphite which, by following the procedure in step B of example 3, and by substituting for allyl bromide an equimolar quantity of dipropargyl bromide and dibenzyl bromide there is obtained dipropargyl cis-propenylphosphonate and dibenzyl cis-propenylphosphonate respectively.

EXAMPLE 4

Ditertiary Butyl Cis-propenyl phosphonate

Step A: Ditertiary Butyl Sodium phosphite

By substituting an equimolar quantity of ditertiary butyl phosphonate for the diisopropyl phosphonate of step A, example 1, and by following the procedure described therein, there is obtained ditertiary butyl sodium phosphite.

Step B: Ditertiary Butyl Ethynyl phosphonate

By substituting in example 1, step B, for the diisopropyl sodium phosphite employed therein an equimolar quantity of ditertiary butyl sodium phosphite and by following the procedure described therein, there is obtained ditertiary butyl ethynyl phosphonate.

Step C: Ditertiary Butyl Cis-propenyl phosphonate

To a solution of tetramethyl diborane (1.45 g., 25 mmoles) in tetrahydrofuran (30 ml.) at 0° to −10° C. is added a solution of ditertiary butyl ethynyl phosphonate (5.5 g., 25 mmoles) in tetrahydrofuran (30 ml.). After the reaction is complete, the solution containing the ditertiary butyl [2-(dimethylboryl)vinyl]phosphonate is allowed to come to room temperature and is then stirred for 45 minutes. The solution of ditertiary butyl [2-(dimethylboryl)vinyl]phosphonate is then cooled to −10° C. and the sodium hydroxide solution (20 ml., 6N) is added followed by the dropwise addition of a solution of iodine (6.35 g., 25 mmoles) in tetrahydrofuran (10 ml.) over a period of 15 minutes. The reaction mixture is allowed to come to room temperature and the excess iodine is decomposed by the addition of a small amount of aqueous sodium thiosulfate. The tetrahydrofuran is removed at reduced pressure and the residue is extracted with chloroform which is then dried over magnesium sulfate. The solution is then filtered and the solvent removed under vacuum to yield ditertiary butyl cis-propenyl phosphonate.

One skilled in the art will appreciate that the processes disclosed in the above examples are merely illustrative and are capable of wide variation and modification without departing from the spirit of this invention.

What is claimed is:

1. A process for preparing a cis-propenylphosphonic acid ester of the formula:

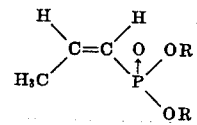

wherein R is lower alkyl, mononuclear aryl, benzyl, lower alkenyl, lower alkynyl or cyclohexyl, which comprises treating a trans-[2-(dimethylboryl)vinyl]phosphonic acid ester of the formula:

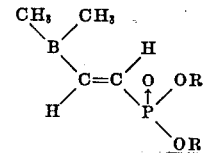

wherein R is as defined above, with iodine in the presence of a base.

2. The process of claim 1 wherein the base is alkali metal hydroxide or alkaline earth metal hydroxide.

3. The process of claim 2 wherein the base is an alkali metal hydroxide.

4. The process of claim 3 wherein the alkali metal hydroxide is sodium hydroxide.

* * * * *